Jan. 2, 1951  E. R. PRICE  2,536,462
TRANSMISSION CONTROL MEANS
Original Filed Jan. 19, 1946  2 Sheets-Sheet 1
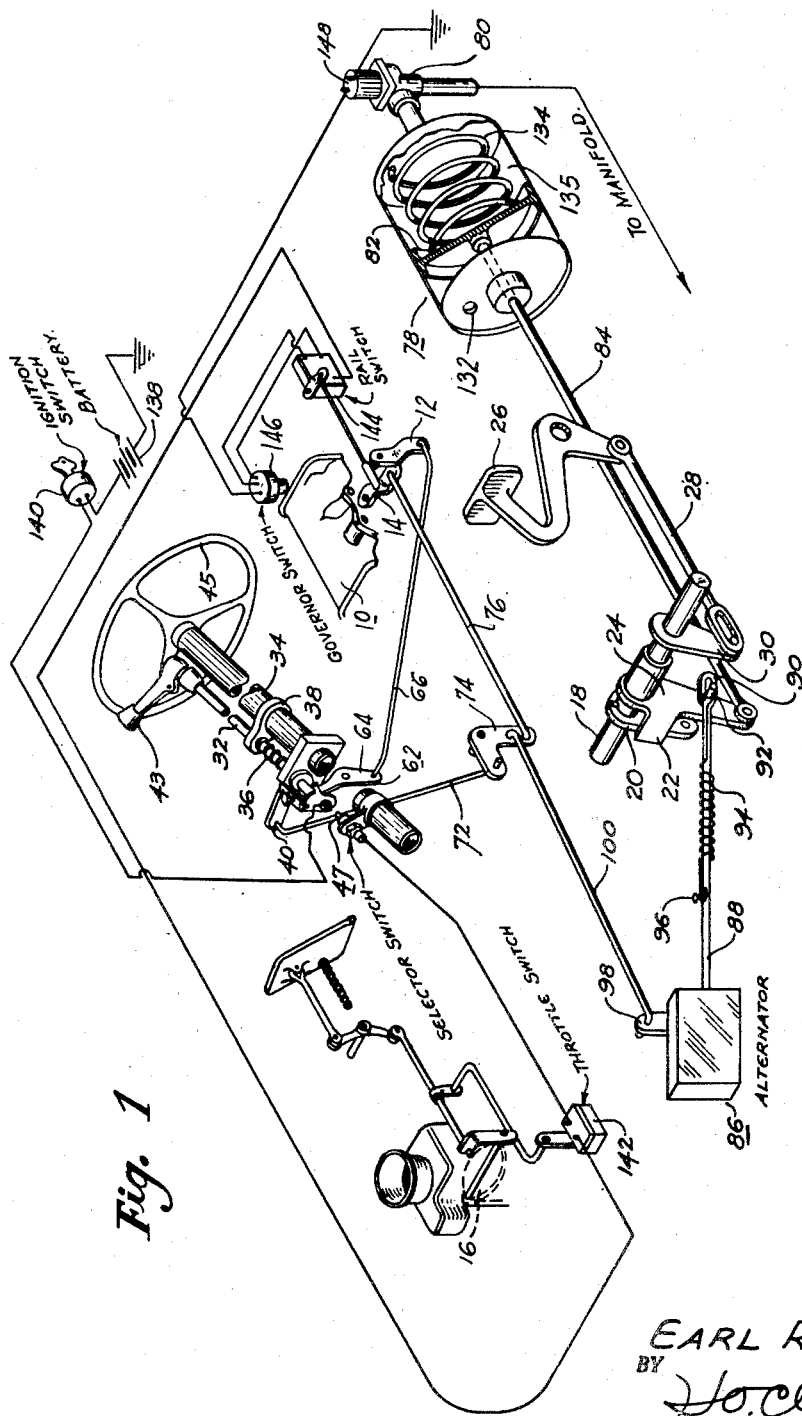
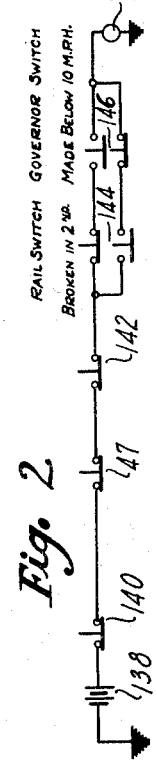
INVENTOR.
EARL R. PRICE.
BY
H. O. Clayton
ATTORNEY.

Jan. 2, 1951          E. R. PRICE          2,536,462

TRANSMISSION CONTROL MEANS

Original Filed Jan. 19, 1946          2 Sheets—Sheet 2

INVENTOR.
EARL R. PRICE.
BY H. O. Clayton
ATTORNEY

Patented Jan. 2, 1951

2,536,462

UNITED STATES PATENT OFFICE 2,536,462

TRANSMISSION CONTROL MEANS

Earl R. Price, South Bend, Ind., assignor to Bendix Aviation Corporation, South Bend, Ind., a corporation of Delaware Original application January 19, 1946, Serial No. 642,240. Divided and this application November 21, 1947, Serial No. 787,373

4 Claims. (Cl. 74—335)

This invention relates to force transmitting means for operating two cranks of a power plant such for example as the two cranks of a three speeds forward and reverse automotive transmission mechanism. Many of the three speeds forward and reverse selective gear transmissions of the present day automotive vehicle include a crank for operating the shift rail selecting mechanism of the transmission and a crank for actuating the selected rail to establish the transmission in the desired setting; and the mechanism of my invention may be employed to operate said cranks.

Yet another object of my invention is to provide manually and power operated force transmitting means, including a manually operated selector lever, for successively operating two cranks, a portion of said force transmitting means being operable either manually or by power at the will of the driver, the power operation being effected by moving the selector lever to a certain position.

Another object of my invention is to include, in the mechanism for operation a three speeds forward and reverse automotive transmission, a control mechanism including a clutch, said mechanism making possible, at the will of the driver of the vehicle, either a complete manual operation of the transmission or a power operation thereof to effect certain settings of the transmission, a gear shift lever of the transmission operating mechanism remaining stationary during the latter operation.

The trend of the present day change speed transmission mechanism of an automotive vehicle is toward a power operated mechanism such as a pressure differential operated motor means; and said mechanism serves to operate the transmission automatically. It is desirable, however, that the driver have the option of manually operating the transmission; and such an operation is necessary in the event of the failure of the aforementioned power means. It is accordingly an object of my invention to provide a clutch mechanism adapted to be incorporated in the transmission operating mechanism of the power plant of the vehicle said mechanism making possible a manual operation of the transmission and also serving to disconnect the gear shift lever of the transmission from the remainder of the mechanism when the transmission is being power operated. The clutch mechanism of my invention is not, however, limited in its use in the power plant of an automotive vehicle; for said mechanism may be used in any power plant where a member, such as a crank, is to be actuated either manually or by power means at the will of the driver.

Yet another object of my invention is to provide a simple and compact clutch mechanism of relatively few parts said mechanism being operated to disengage the clutch by a certain operation of the driving element of the clutch; and in a preferred embodiment of my invention said driving element is moved both axially and angularly in effecting the de-clutching operation.

The above and other objects and features of the invention will appear more fully hereinafter from a consideration of the following description taken in connection with the accompanying drawings wherein one embodiment of the invention is illustrated by way of example.

Figure 1 is a diagrammatic view disclosing the force transmitting means of my invention employed as a part of the mechanism for operating an automotive transmission;

Figure 2 is a wiring diagram of the electrical mechanism disclosed in Figure 1;

As is disclosed in Figure 1 the mechanism of my invention is included as a part of the transmission operating mechanism of an automotive vehicle said mechanism including a three speeds forward and reverse transmission of well known design. This transmission is operated by means of a manually operated crank 12 and a power and manually operated crank 14 the crank 12 serving to operate the shift rail selecting mechanism of the transmission and the crank 14 serving to operate that part of the transmission functioning to move the selected rail to establish the transmission in its desired gear ratio. With such a transmission the crank 14 must be moved to its transmission neutral position to neutralize the transmission before the shift rail selecting crank 12 may be operated.

My invention has to do with the manually and power operated means for actuating the aforementioned cranks 12 and 14 however it is to be particularly noted that said invention is not limited to a mechanism for operating the transmission of an automotive vehicle; for said mechanism may also be employed to operate two cranks of any type of power plant where it is desirable to either manually operate both of said cranks or, at the will of the driver, operate one of said cranks by power means.

Figure 3:
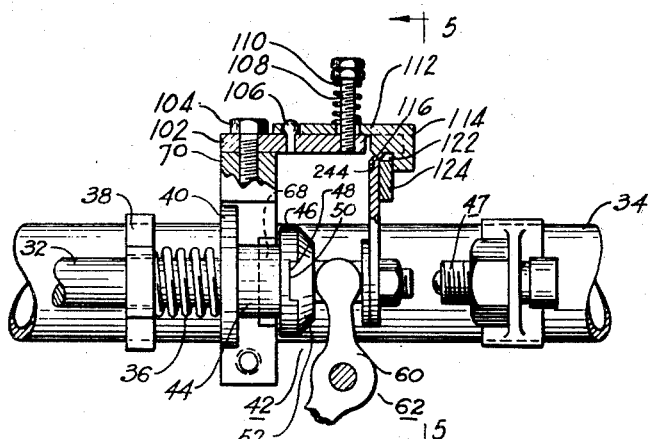
Figure 3 is a view disclosing the principal features of the force transmitting means constituting my invention.
Figure 4:
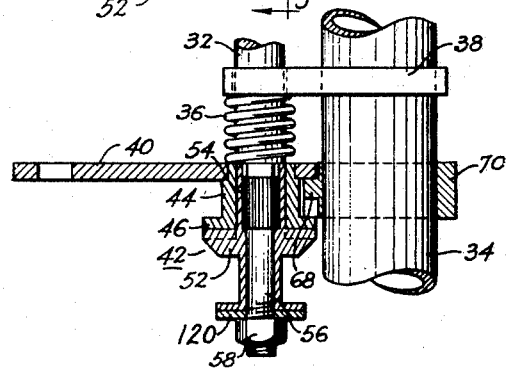
Figure 4 is a sectional view, taken on the line 4—4 of Figure 5, disclosing certain details of the mechanism of Figure 3.
Figure 5:
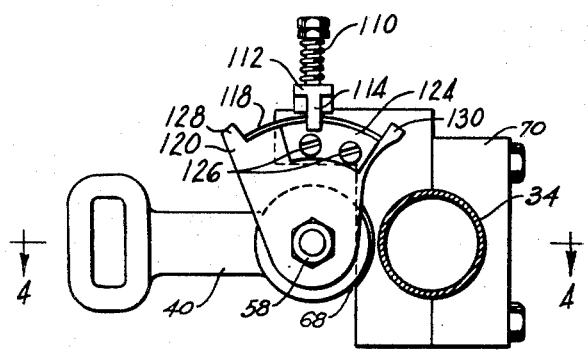
Figure 5 is a front view of the force transmitting means of my invention, said view being taken on the line 5—5 of Figure 2.

The essence of my invention lies in the crank operating force transmitting means disclosed in detail in Figures 3, 4, and 5 and in a power means cooperating therewith. One embodiment of the latter means is disclosed in Figure 1, however various means other than that disclosed in this figure may be used to actuate the crank 14.

The embodiment of my invention disclosed in Figure 1 is also disclosed in my application No. 642,240, filed January 19, 1946, the instant application constituting a division thereof; and this embodiment includes a manually and power operated means for operating the change speed transmission of an automotive vehicle, the clutch of the vehicle being operated to facilitate said operation.

Briefly describing the mechanism of Figure 1 the friction clutch, not shown, is operably connected to a clutch throw out shaft 18 to which is keyed a crank member 20 contactable by a flange member 22 extending laterally from a crank member 24 rotatably mounted on the shaft 18. The conventional manually operated clutch pedal 26 of the car is operably connected, by a link 28, to a crank 30 which is drivably connected to the shaft 18. As is disclosed in Figure 1 the connection between the crank 30 and link 28 is of the lost motion type to obviate a movement of the clutch pedal when the clutch is power operated by the mechanism described hereinafter.

The shift rail operating cranks 12 and 14 are actuated by force transmitting means including a rotatable and bodily movable shaft 32 extending alongside the steering column 34 of the vehicle. As is disclosed in Figures 1, 3, and 4, the shaft 32 is biased downwardly by a spring 36 positioned between a stop 38 mounted on the steering column and a crank member 40 which is operably connected to said shaft by means of a clutch mechanism 42 described hereinafter. A shift lever 43 mounted beneath the steering wheel 45 is so connected to the shaft 32 that a rotation of said lever in a plane parallel to said wheel effects a rotation of shaft about its longitudinal axis in the operation of either neutralizing the transmission or establishing the same in a gear setting; and this connection between the shift lever and shaft 32, which incidentally was used on the 1942 Dodge car, is also such that the movement of the lever in a plane perpendicular to the plane of the steering column, results in a movement of the shaft 32 to either effect a shift rail selecting operation of the crank 12 or effect a declutching operation of the clutch 42 and a closing of a selector switch 47 to prepare the mechanism for its power operation.

Describing the aforementioned clutch mechanism 42, the said mechanism includes a member 44 sleeved over the lower end of the shaft 32, said member being permanently secured, as by brazing, to the crank 40. The lower end portion of the member 44 is provided with a flange 46 which is recessed at 48, Figure 3, to provide a keyway for a key portion 50 of a spool-shaped end portion of a clutch member 52, said member being sleeved over and drivably connected by splines 54 to the end portion 56 of the shaft 32. A nut 58, threaded on the end of the shaft portion 56, serves as a stop for the clutch mechanism which is biased downwardly by the operation of the spring 36.

The upper arm 60 of a bell-crank lever 62 fits within the spool-shaped portion of the clutch member 52 and the lower arm 64 of said lever is pivotally connected, by a link 66, to the shift rail selecting crank 12. As is disclosed in Figure 4, the spring 36 serves to bias the clutch 42 and shaft 32 as a unit downwardly, the movement being limited by a stop 68, Figure 4, constituting a part of a steering column mounted bracket member 70; and in this position of the clutch 42 the shift rail selector crank 12 is actuated to prepare the transmission for either a second gear or high gear operation, said operation of course depending upon the subsequent actuation of the shift rail operating crank 14. To actuate the crank 12 to prepare the transmission for either a low gear or reverse gear operation, that is a selection of the low and reverse gear shift rail of the transmission, the driver lifts the shift lever 43 upwardly in a plane perpendicular to the plane of the steering wheel; and this operation serves to rotate the bell crank lever 62 in a counter-clockwise direction, Figure 3, the spring 36 being compressed and the flange 46, Figure 4, being moved into engagement with the stop 68. To actuate the shift rail operating crank 14 to neutralize the transmission or establish the same in any one of its four gear ratio settings, the driver rotates the shift lever 43 in a plane parallel to the plane of the steering wheel thereby effecting an angular movment of the crank 40 which is preferably connected to the crank 14 by force transmitting means including link 72, a bell crank lever 74 and a link 76.

There is thus provided, by the above described mechanism, means for manually operating a three-speeds forward and reverse transmission; and in this manual operation of the transmission the shift lever 43 is movable to six different positions, said selective movement outlining the letter H.

A feature of the mechanism of Figure 1 lies in the power means for operating the transmission and clutch and said means is diagrammatically disclosed in Figure 1. The principal element of this power means consists of a single acting fluid pressure motor 78 operably connected to the clutch throwout shaft 18 and to the shift rail operating crank 14; and said motor is controlled by a standard type of solenoid operated three way valve 80, no claim to which is made.

Describing now the details of the aforementioned power means, the power element 82 of the motor 78 is connected to the crank 24 by a link 84; and said crank is yieldingly connected to an alternator that is a direction changing mechanism 86 by means, preferably including a pin 92 extending from the crank. One end of a spring 94, preferably coiled around the link 88, is connected to a pin 96 secured to said link; and the other end of said spring is fastened to the pin 92. A crank 98 of the alternator mechanism 86 is pivotally connected to the bell crank lever 74 by a link 100. The alternator mechanism 84 is not disclosed in detail inasmuch as this well known type of mechanism may be of any standard design. Suffice it to say that with the alternator 86 constituting a part of the force transmitting linkage interconnecting the motor 78 and crank 14, successive lineal movements of the rod 88 in one direction will effect a reciprocatory movement of said crank. There is thus provided, in the alternator 84, means whereby the transmission operating angular movement of the crank 14 is alternately reversed with each successive energization of the single-acting motor 78.

As to the means for controlling the operation of the motor 78, said means includes the electrical mechanism disclosed in Figures 1 and 2; and this mechanism comprises a grounded battery 138, the ignition switch 140 of the car, the aforementioned shift lever operated selector switch 47, an accelerator operated breaker switch 142 which is closed when the accelerator is released, a shift rail operated switch mechanism 144, a vehicle speed responsive single pole double throw governor operated switch mechanism 146 and a grounded solenoid 148 which operates the motor controlling three way valve 80. The aforementioned switch mechanisms are electrically interconnected as disclosed in Figure 2, and of said mechanisms the accelerator operated switch 142 is of a conventional breaker switch construction; accordingly, the same is not disclosed in detail.

The switch mechanisms 144 and 146 are disclosed in detail in my aforementioned parent application No. 642,240, however for the present purposes suffice it to say that the mechanism 144 is so constructed that one electrical circuit through the mechanism, Figure 2, is broken when the transmission is established in its second gear setting and the other circuit through the mechanism is broken when the transmission is established in its third gear setting. As to the governor operated switch mechanism 146, it will be noted, from an inspection of Figure 2, that one electrical circuit through the mechanism is made when the vehicle is traveling below 10 miles per hour and another electrical circuit through the mechanism is made when the vehicle is traveling above 10 miles per hour; and both of said circuits are connected to the grounded valve operating solenoid 148.

There is thus provided, in the switch mechanisms 144 and 146 and the accelerator and gear shift lever operated switches 142 and 47 cooperating therewith, electrical means for controlling the valve 80 to initiate operations of the motor 78 at certain vehicle speeds and to automatically cut said motor out of operation that is de-energize the motor, when the setting of the transmission has been effected.

Describing now the complete operation of the mechanism of my invention, and incidentally completing the description of the parts of said mechanism not heretofore described, it will be assumed that the three-speeds forward and reverse transmission 10 is neutralized and that the car is at a standstill with the engine idling, thereby making of the intake manifold of said engine a source of vacuum. The driver will then probably wish to establish the transmission in its low gear setting whereupon he will first manually depress the clutch pedal 26 to disengage the clutch and will then operate the shift lever 43 to manually effect said setting.

In this operation the force transmitting linkage of my invention is operated to successively actuate the cranks 12 and 14. The accelerator will then be depressed as the clutch is re-engaged to get the car under way; and after the desired car speed is reached, the shift lever and clutch pedal are again operated to establish the transmission in its second gear setting. The car being then under way in second gear at the desired speed, the driver will probably wish to be relieved of the operation of the transmission and clutch; accordingly, to effect this result he will move the shift lever to its automatic position, that is, one of the seven selective positions of said lever. Describing the latter operation the shift lever 43, which at the time is in its second gear setting, is rotated downwardly that is angularly in a clockwise direction in a plane perpendicular to the plane of the steering wheel; and this operation serves to bodily move the shaft 32 downwardly to disengage the clutch 42 and close the switch 47.

In this declutching operation of the clutch mechanism 42, the driving clutch member 52 is moved away from the driven clutch member 44 the movement of the latter being prevented by the stop 68. The two clutch members are preferably biased into engagement with each other by a spring, not shown, included in the connection between the shift lever 43 and the shaft 32.

Referring to Figures 3 and 5 there is disclosed a latch mechanism for holding the shift lever in its automatic position, said mechanism including a relatively narrow rectangular shaped support member 102, preferably detachably secured to the bracket member 70 by a bolt 104; and there is mounted on said support member, by means of a guide pin 106, a bolt 108 and a spring 110, a movable latch member 112 shaped at its outer end to provide a relatively narrow stop member 114. Now when the shift lever 43 is moved to its automatic position a relatively narrow wedge-shaped flange portion 116 of the member 112 is rocked and/or bodily lifted, against the tension of the spring 110, by the camming action of a wedge-shaped peripheral edge portion 118 of a stop member 120 which is secured to the pin 56, Figure 4, between the lower flange portion of the clutch member 52 and the nut 58; and this operation serves to position said peripheral edge portion 118 in the space indicated by the reference numeral 122, Figure 3. Incidentally the shift rail selecting mechanism of the transmission and the cooperating transmission parts are so constructed that the crank 62 may be moved beyond its second and high shift rail selective position in effecting the above described automatic setting of the shift lever.

Now at this juncture it is to be noted, from an inspection of Figure 5, that a rectangular shaped stop member 124, secured to the outer face of the stop member 120 by screws 126, is in contact with the member 114 when the parts are in their transmission neutral position and when the spring 36 has operated to move the crank 12 to its second and high shift rail position, that is the position preparing the transmission for either second or high gear operation. It follows therefore that the stop member 120 must be rotated clockwise in Figure 5 so that the member 124 will clear the member 114 before the shift lever may be moved downwardly to its automatic position, that is, the position to close the switch 47; and it becomes apparent from the above description that the parts of the mechanism are so constructed and arranged that this automatic setting of the shift lever may only be effected after said shift lever has been moved to establish the transmission in its second gear setting. Referring to Figure 5 of the drawings in this position of the parts, that is the second gear setting, a stop 128 on the member 120 will contact the side of the members 102 and 112 and the stop member 124 will be positioned to the right of the member 114. Completing the description of the member 120 a stop 130 is provided thereon to contact one side of the members 102 and 112 when the shift lever is moved to either its low or high gear position.

Continuing the description of the operation of the mechanism the driver having moved the shift lever to its automatic position and assuming that the car is traveling above governor speed the transmission will then be automatically established in its high gear setting after the driver releases the accelerator to close the switch 142; for with this operation an electrical circuit is completed via the grounded battery 138, the ignition switch 140, the then closed selector switch 47, the then closed accelerator operated switch 142, one of the switches of the rail switch 144, Figure 2, one of the switches of the governor operated switch 146, and the grounded solenoid 148. The resulting operation of the three way valve 80 effects an energization of the motor 78 the piston 82 of the latter being then subjected to a differential of pressures to move the same to the right, Figure 1. The left side of the piston 82 is at all times subjected to the pressure of the atmosphere via an opening 132 in one end of the motor and the right side of said piston, that is, the side constituting a wall of compartment 135, is subjected to a relatively low gaseous pressure when the three way valve 80 is opened to interconnect said compartment with the intake manifold or other source of vacuum. When the latter valve is closed, that is, when the solenoid 148 is de-energized, the compartment 135 is vented to the atmosphere through said valve and the spring 134 within said compartment is then operative to move the piston 82 to the left, Figure 1, to permit a re-engagement of the friction clutch.

Describing the clutch disengaging and transmission operating operation of the motor 78 the above referred to rightward movement of the piston 82 serves to rotate the crank 24 to disengage the clutch; and as this operation is being effected the spring 94 is expanded inasmuch as the rod 88 cannot be moved to operate the transmission until after the driving torque is reversed, that is, until after the clutch is disengaged. Now immediately after the clutch plates are moved out of contact with each other to reverse the driving torque the above described force transmitting means interconnecting the rod 88 and crank 14 becomes operative to move said crank and establish the transmission in its high gear setting; and as this operation of the transmission is being completed the rail switch 144 is broken. Now the breaking of the latter switch results in a de-energization of the solenoid 148 and as described above this results in a de-energization of the motor 78 to permit a re-engagement of the clutch. At this juncture it is to be remembered that when the alternator 86 is operated in the operation of establishing the transmission in its high gear setting said alternator is operated immediately thereafter to preselect a subsequent operation of the transmission to establish the same in its second gear setting.

The transmission will now remain in its high gear setting until the car is slowed down below governor speed and the accelerator is released whereupon the motor 78 will again be energized to establish the transmission in its second gear setting and to operate the clutch to facilitate said operation.

In the mechanism of Figure 1 there is provided a simple and effective manually and power operated mechanism for operating the transmission of an automotive vehicle. With such a mechanism the driver may manually operate the clutch and the three speeds forward and reverse transmission in a conventional manner, that is, by operating the clutch pedal and by effecting the H movement of the shift lever; then if he desires an automatic operation of the transmission to alternately establish the same in its second and high gear settings he has only to move the shift lever from its second gear setting to its automatic setting. Thereafter for all normal straight ahead driving of the vehicle the driver need only operate the accelerator. However, if the car becomes mired he probably will, after a manual disengagement of the clutch, operate the shift lever to establish the transmission in its low gear setting; and to reverse the direction of movement of the car the driver must, of course, first manually disengage the clutch and then operate the shift lever to establish the transmission in its reverse gear setting.

If a second gear setting of the transmission is desired when the transmission is established in its high gear setting and the shift lever is positioned in its automatic setting, then the driver will, after manually disengaging the clutch, first move the shift lever out of its automatic setting whereupon he will successively rotate the shift lever to its high gear position to mesh the clutch members 44 and 52 and then rotate said lever to its second gear position.

There is thus provided, by the force transmitting linkage of my invention, a simple and compact mechanism for successively operating two cranks of a power plant; and with this mechanism one of said cranks may, at the will of the operator, be operated either by the physical effort of the driver or by power means.

Although only one embodiment of the invention has been illustrated and described, various changes in the form and relative arrangements of the parts may be made to suit requirements.

I claim:

1. Manually and power operated force transmitting means for successively operating two cranks of a transmission including a manually operated driving clutch member, force transmitting means adapted to interconnect said member with one of the said cranks, a driven clutch member, force transmitting means adapted to interconnect the latter clutch member with the other of said cranks, power means connected to the latter force transmitting means, and latch means for holding the clutch members separated when the power mechanism is operative to actuate the last mentioned force transmitting means.

2. Manually and power operated force transmitting means for successively operating two cranks of a transmission including a manually operated driving clutch member, force transmitting means adapted to interconnect said member with one of the said cranks, a driven clutch member, force transmitting means adapted to interconnect the latter clutch member with the other of said cranks, power means, including a pressure differential operated motor, connected to the latter force transmitting means, and latch means, including a plurality of relatively movable members, for holding the clutch members separated when the power mechanism is operative to actuate the last mentioned force transmitting means.

3. Manually and power operated means adapted to operate a three speeds forward and reverse automotive transmission including a shift rail selecting crank and a shift rail actuating crank, including a manually operated shift lever, a driving clutch member, force transmitting means interconnecting the shift lever and driving clutch member, force transmitting means adapted to interconnect the driving clutch member and the shift rail selecting crank, a driven clutch member, force transmitting means adapted to interconnect the latter member with the shift rail actuating crank, and power means for actuating the latter force transmitting means.

4. Manually and power operated means adapted to operate a three speeds forward and reverse automotive transmission including a shift rail selecting crank and a shift rail actuating crank, said means including a manually operated shift lever, a driving clutch member, force transmitting means interconnecting the shift lever and driving clutch member, force transmitting means adapted to interconnect the driving clutch member and the shift rail selecting crank, a driven clutch member, force transmitting means adapted to interconnect the latter member with the shift rail actuating crank, latch means for holding the clutch members separated when the driving clutch member is moved to a certain position, and power means, including a pressure differential operated motor, for actuating the latter force transmitting means.

EARL R. PRICE.

REFERENCES CITED

The following references are of record in the file of this patent:

UNITED STATES PATENTS

| Number | Name | Date |
|---|---|---|
| 1,137,507 | McKeever | Apr. 27, 1915 |
| 2,275,779 | MacPherson | Mar. 10, 1942 |
| 2,277,913 | Kesling | Mar. 31, 1942 |
| 2,292,325 | Lowler | Aug. 4, 1942 |
| 2,292,633 | Griswold | Aug. 11, 1942 |
| 2,324,571 | Fitz | July 20, 1943 |
| 2,359,490 | Rappl | Oct. 3, 1944 |
| 2,365,732 | Snow | Dec. 26, 1944 |
| 2,374,303 | Osborne | Apr. 24, 1945 |

FOREIGN PATENTS

| Number | Country | Date |
|---|---|---|
| 393,380 | Great Britain | June 1, 1933 |
| 496,727 | Great Britain | Dec. 2, 1938 |